United States Patent [19]

Hayashi et al.

[11] Patent Number: 4,614,681
[45] Date of Patent: Sep. 30, 1986

[54] PHOTOGRAPHIC SUPPORT

[75] Inventors: Hiroshi Hayashi; Kazunobu Katoh; Takashi Yoshida, all of Kanagawa, Japan

[73] Assignee: Fuji Photo Film Co., Ltd., Kanagawa, Japan

[21] Appl. No.: 638,549

[22] Filed: Aug. 8, 1984

Related U.S. Application Data

[63] Continuation of Ser. No. 145,502, Apr. 30, 1980, abandoned.

[30] Foreign Application Priority Data

Oct. 22, 1979 [JP] Japan .............................. 54-136077
Dec. 3, 1979 [JP] Japan .............................. 54-156474

[51] Int. Cl.$^4$ .................... B32B 5/16; B32B 27/08; B32B 27/36; G03C 1/76
[52] U.S. Cl. .................................. 428/201; 428/204; 428/207; 428/332; 428/334; 428/335; 428/480; 428/483; 430/131; 430/536; 430/537; 430/961
[58] Field of Search ............... 428/480, 483, 500, 516, 428/523, 223, 201, 204, 207, 335, 332, 334; 430/220, 207, 961, 131, 536, 537

[56] References Cited

U.S. PATENT DOCUMENTS

| | | | |
|---|---|---|---|
| 3,415,645 | 12/1968 | Land | 430/220 |
| 3,415,646 | 12/1968 | Land | 430/220 X |
| 3,700,449 | 10/1972 | Lerner | 430/961 X |
| 3,932,692 | 1/1976 | Hirata et al. | 428/474 |
| 3,949,114 | 4/1976 | Viola et al. | 428/483 X |
| 3,993,486 | 11/1976 | Oishi | 428/223 X |
| 4,087,574 | 5/1978 | Yamaguchi et al. | 428/483 X |
| 4,255,490 | 3/1981 | Katsura | 428/483 |
| 4,267,143 | 5/1981 | Roullet | 428/483 X |

OTHER PUBLICATIONS

Research Disclosure, No. 15162, Nov. 1976, pp. 80–84.

Primary Examiner—Thomas J. Herbert
Attorney, Agent, or Firm—Sughrue, Mion, Zinn, Macpeak, and Seas

[57] ABSTRACT

A photographic support comprising a plastic film having on at least one surface thereof a layer comprising a polymer that including ethylene units of the formula

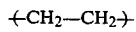

and vinyl alcohol units of the formula

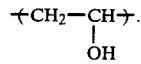

13 Claims, No Drawings

PHOTOGRAPHIC SUPPORT

This application is a continuation of application Ser. No. 145,502, filed Apr. 30, 1980, now abandoned.

BACKGROUND OF THE INVENTION

1. Field of the Invention

This invention relates to a photographic support, and more particularly, to an improved photographic support for supporting a photographic image.

2. Description of the Prior Art

Conventionally, various plastic films are known as photographic supports such as cellulose acetate film, polyester film, polycarbonate film, polystyrene film, and polyolefin film. Among various characteristics required for a photographic support, oxygen permeability is of great importance. It has been found that low oxygen permeability of the support results in improved stability of the developed photographic image, especially high resistance to discoloration upon extended exposure to light, as well as stability with respect to the quality of a produced photographic film during storage.

The known photographic supports mentioned above do not have adequate oxygen barrier properties, and the idea of reducing the overall oxygen permeability by making a composite film having a polymeric material of low oxygen permeability on at least one surface of a support is described in *Research Disclosure*, No. 15162, November 1976. At page 82, in the left column thereof, materials such as polyvinyl alcohol, carboxymethyl cellulose, hydroxyethyl cellulose and alignate salt are mentioned. Polyvinyl alcohol has particularly high oxygen barrier properties under conditions of low humidity. However, these materials are hygroscopic, and when under conditions of high humidity (R.H. of at least 70%), their oxygen permeability increases significantly. In addition, when these materials are immersed in a wet photographic processing solution, they absorb much water and result in a photographic product which is difficult to dry. As a result, the total processing time is extended.

As described in *Research Disclosure*, supra, in the *Journal of Polymer Science Symposium*, Vol. 41, page 1, 1973 other materials are listed which are known to have low oxygen permeability, including polyvinylidene chloride, polycaprolactam, polychlorotrifluoroethylene, and polyvinyl chloride. Polyvinylidene chloride has oxygen barrier properties similar to those of polyvinyl alcohol, but a coating film thereof undergoes gradual dehydrochlorination during storage, and the hydrochloric acid generated adversely affects a photographic product using such film. A film of polyvinlyidene chloride turns to a yellowish brown color during storage, causing disadvantages in observing an image or performing exposure through such film. Polycaprolactam has inadequate oxygen barrier properties under high humidity. The oxygen barrier properties of polychlorotrifluoroethylene and polyvinyl chloride are about equal to those of polyester used as a known photographic support, and they are not sufficient to provide satisfactory oxygen barrier properties in combination with a polyester support.

As is clear form the foregoing, a photographic support with good oxygen barrier properties that is effective over a wide temperature range, is waterproof, does not emit any harmful gas, and is free from discoloration, has not yet been obtained.

SUMMARY OF THE INVENTION

As a result of extensive studies to find a photographic support that satisfies these conditions, it has now been found that such conditions can be met by a photographic support having on at least one surface of a plastic film an oxygen barrier layer comprising a copolymer including units of the formula

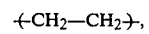

hereinafter also referred to as ethylene, and units of the formula

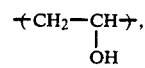

hereinafter as referred to as vinyl alcohol. Preferably, the photographic support of this invention has on at least one surface of the plastic film an oxygen barrier layer comprising an ethylene-vinyl alcohol copolymer having an ethylene content of from about 10 to 90 mol% and a vinyl alcohol content of from about 90 to 10 mol%. More preferably, the photographic support has on at least one surface of the plastic film a layer comprising an ethylene-vinyl alcohol copolymer having an ethylene content of from 20 to 70 mol%.

DETAILED DESCRIPTION OF THE INVENTION

The layer that contains the copolymer of the type specified above is hereafter referred to as "an oxygen barrier layer".

The oxygen barrier layer to be used in this invention (sometimes referred to herein as the "barrier layer" or simply as the "layer") is provided on one or both surfaces of the plastic film. When it is provided on one surface of the film, it is placed either between the film and a photographic layer or on the side opposite to the photographic layer. To provide good curl balance, such a layer is advantageously positioned on the side opposite to the photographic layer.

The ethylene-vinyl alcohol copolymer to be used in this invention contains about 10 to 90 mol%, preferably from about 20 to 70 mol%, and most preferably from 26 to 45 mol% ethylene.

A preferred compolymer for incorporation in the oxygen barrier layer of this invention is a saponified ethylene-vinyl acetate copolymer (in other words, an ethylene-vinyl alcohol copolymer), having a preferred ethylene contact of from 20 to 70 mol% and a degree of saponification of at least 90%, and preferably of at least 96%. The polymer contains a small amount of unsaponified vinyl acetate, and the content of such vinyl acetate is desirably held to a minimum, because it has a tendency to increase the oxygen permeability of the support.

Various grades of commercial product are available and can be used to form an oxygen barrier layer of ethylene-vinyl alcohol copolymer according to the invention. For example, Kuraray Co., Ltd. furnishes Eval ® (a registered trademark) E (a polymer having a softening point of 155° C., a melt viscosity of $0.7 \times 10^4$ poises at 210° C. and containing about 60 mol% of

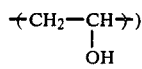

and Eval® F (a polymer having a softening point of 175° C., a melt viscosity of 1.3×10⁴ poises at 210° C. and containing about 70 mol% of

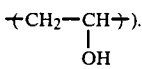

These compounds are known and described in "Eval®" published by Poval Sales Division of Kuraray Co., Ltd.

The ethylene-vinyl alcohol copolymer to be incorporated in the oxygen barrier copolymer of this invention can be synthesized by known methods. For example, *KOBUNSHI RONBUNSHU*, Vol. 35, No. 1, pp. 33–39, January 1978 describes the saponification of an ethylene-vinyl acetate copolymer resin with an alkali. Japanese Patent Publication Nos. 40547/70 and 14958/68 describe a continuous process of saponification with an alkali to produce a polymer of high saponification degree that is suitable for use in this invention.

If desired, the copolymer to be incorporated in the oxygen barrier layer of this invention may be a terpolymer comprising ethylene

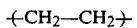

groups, vinyl alcohol

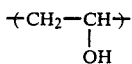

groups, and divalent groups derived from various other ethylenically unsaturated monomers known to those skilled in the art. Examples of suitable ethylenically unsaturated monomers include known olefins, acrylate esters such as methyl acrylate and n-butyl acrylate, methacrylate esters such as methyl methacrylate and n-butyl methacrylate, and vinyl esters. In preparing such terpolymers, the ethylenically unsaturated monomer is desirably used in an amount of less than 20 wt%.

The oxygen barrier layer according to the invention preferably employs the ethylene-vinyl alcohol copolymer alone to obtain desirable oxygen barrier properties, but for the purpose of providing other characteristics and capabilities, it may be used in combination with other polymers or additives of lower molecular weight. For instance, a cross-linking agent such as trimethylolmelamine or dimethylolurea may be added in an amount of 1 to 5 wt%, based on the weight of the polymer. In *The Theory of the Photographic Process*, 4th Ed., by James, Macmillan Co., 1977, at pp. 77–87 various cross-linking agents are mentioned, and suitable compounds may be selected from these agents if desired.

The oxygen barrier layer may also contain an antioxidant to provide further improvement in light fastness. Illustrative antioxidants include hindered phenols such as 2,6-di-tert-butyl-4-methylphenol, 2,2'-butylidenebis(6-tert-butyl-4-methylphenol), and 4,4'-thiobis(3-methyl-6-tert-butylphenol), as well as phenyl-β-naphthylamine, N,N'-di-sec-butyl-p-phenylenediamine, phenothiazine and N,N'-diphenyl-p-phenylenediamine.

The oxygen barrier layer may also contain an ultraviolet absorber, such as, for example, 2-(3',5'-di-tert-amyl-2'-hydroxyphenyl)benzotriazole, 2-(2'-hydroxy-3',5'-di-tert-butylphenyl)-5-chlorobenzotriazole, 2-(3',5'-di-tert-butyl-2-hydroxyphenyl)benzotriazole, 2-(2'-hydroxy-5'-methylphenyl)benzotriazole, 2-(hydroxy-5-tert-butylphenyl)benzotriazole, 2-hydroxy-4-methoxybenzophenone, 2,2'-dihydroxy-4-methoxybenzophenone, 2-hydroxy-4-methoxy-2'-carboxybenzophenone, 2-hydroxy-4-n-octoxybenzophenone, 2,4-dihydroxybenzophenone, 2-ethylhexyl-2-cyano-3,3'-diphenyl acrylate, p-octylphenyl salicylate, 2,4-di-tert-butylphenyl-3,5-di-tert-butyl-4-hydroxybenzoate.

If desired the oxygen barrier layer may contain a fluorescent brightening agent selected from various known compounds, such as stilbenes, cumaric acid, carbostyrils, diphenylpyrazolines, naphthalimides and arylazolyls. Specific examples of the fluorescent brightening agent include commercial products such as Whiteflour B and Whitephore PCN (trademarks for products of Sumitomo Chemical Co., Ltd.), Hakkol PY-1800, PY-2000 and PY-B (trademarks for products of Showa Chemical Co., Ltd.), Kayalight B, Kayalight OS (trademarks for products of Nippon Kayaku Co., Ltd.), Hi-bright 1001 (trademark for product of Dainichi Seika Colour & Chemicals Mfg. Co., Ltd.), Unitex OB (trademark for product of Ciba-Geigy Co.), and Mikephore ETN (trademark for product of Mitsui Toatsu Chemicals, Inc.).

The thickness of the oxygen barrier layer according to the invention can be varied with the intended use, and it is generally about $0.5\mu$ or more, preferably in the range of from 0.5 to $100\mu$, and more preferably from 1 to $50\mu$. A thickness of less than $0.5\mu$ does not provide the desired oxygen barrier effect, and with a thickness greater than $100\mu$, the resulting photographic product becomes too thick and presents difficulty in handling. If the thickness of the plastic film to which a coating of the copolymer is applied is reduced to offset such difficulty, the photographic product obtained has little rigidity and is poor in appearance. Furthermore, if the thickness of the oxygen barrier layer exceeds $100\mu$, curl balance is adversely affected, thus damaging the aesthetic appeal of the photographic product.

The photographic support of this invention desirably contains in the plastic film and/or oxygen barrier layer a light-absorbing or scattering dye and a pigment such as titanium dioxide and carbon black, in order to prevent entrance of undesired light into a camera through the film support. Examples of such dyes include known dyes such as those described in Japanese Patent Application (OPI) Nos. 37725/79 (the term "OPI" as used herein refers to a "published unexamined Japanese patent application"), 37726/79, 14245/72, British Pat. No. 1,287,479, U.S. Pat. Nos. 2,622,026, 3,728,124, 3,822,132, Japanese Patent Application (OPI) No. 34958/73 and Japanese Patent Publication No. 8735/72. These dyes may be incorporated in the oxygen barrier layer or the plastic film in an amount ranging from 10 to $10^3$ ppm by weight, depending upon the amount necessary to achieve the desired object.

If a colored photographic support is desired for the purpose of preventing halation, a suitable dye, for example, the known dyes mentioned above, may be incorporated in the polymer of the plastic film in an amount of from $10^2$ to $10^4$ ppm by weight. If it is desired to provide a light-tight support, a dye selected from various dyes, including those mentioned above, as well as pigments such as carbon black and titanium dioxide, can be added to the polymer of the plastic film in amounts sufficient to provide an optical density of from 5 to 10. If the support of this invention is used in a photographic support that provides a photographic image to be viewed under reflected light, a white pigment such as titaniun dioxide is preferably added to the polymer in an amount of from about 5 to 30 wt%, to thereby provide an optical density of 1.0 or higher.

In the case of a translucent white support, which is required for a photographic product (e.g., using a silver dye bleach process) that displays a photographic image to be viewed under transmitted light, a white pigment such as titanium dioxide can be added to the polymer of the plastic film in an amount required to provide an optical density of from 0.3 to 2.0.

For the purpose of providing a photographic support according to the invention with improved slipperiness, a matting agent comprising silicon dioxide and polymer particles, particularly those of a polymer cross-linked with a cross-linking agent such as divinylbenzene, or a slip agent such as silicone oil or wax may be incorporated in the polymer of the plastic film.

According to a further embodiment of a photographic support of this invention, the support having the oxygen barrier layer coated thereon may be passed through a pair of compression rolls heated to a temperature higher than the softening point of the copolymer contained in the barrier layer, thereby providing various mechanically deformed surfaces according to the nature of the surface of at least one compression roll. For instance, either a uniform glossy surface or a fine-grained surface (e.g., matted surface, lustrous surface, or silky surface) can be provided by a compression roll having a corresponding surface pattern.

According to this invention, the plastic film of the photographic support can be formed of various known materials conventionally used in photographic sensitive materials, such as a polyester film, e.g., cellulose acetate film or polyethylene terephthalate film; a polystyrene film; a polycarbonate film; or a polyolefin film, e.g., a polyethylene film. A suitable material can be selected depending on the desired properties of the film, but generally a polyester film is preferred in view of its high resistance to heat and solvents. Other suitable materials that can be used include synthetic paper produced from polymeric films formed from the materials noted above, which are whitened by surface treatment with a solvent, by blending with a pigment or by foaming the films to provide a porous structure, as well as synthetic paper in the form of a woven or non-woven fabric which is produced from synthetic fibers spun from the polymeric materials. The thickness of the plastic film can be varied widely depending on the properties desired; generally the thickness can range from about 50 to 300μ, and preferably ranges from 75 to 180μ.

The plastic film may optionally contain UV absorbers, antioxidants, fluorescent brightening agents, dyes and pigments of the types described hereinbefore.

The plastic film of the support can be made of the same copolymer that forms the oxygen barrier layer according to the invention, but this is not preferred, because the film support obtained is too soft to provide a flat-surfaced photographic product having the desired degree of rigidity. Although on the basis of the concept of this invention the possibility of making a film support from a mixture of the polymer used to form the oxygen barrier layer according to the invention and other film-forming polymers, it is found that if the content of the other polymer is increased to a level that provides the rigidity necessary for making a film support, the support obtained exhibits unsatisfactorily low oxygen barrier properties, and fails to achieve the intended purposes of this invention.

The oxygen barrier layer of this invention can be disposed on the plastic film by lamination of plastic film, extrusion lamination or solvent coating. One method is to laminate the plastic film with a sheet of an oxygen barrier polymer which is extruded from a die at a temperature to 210° to 270° C. Since the plastic film is contacted by a melted polymer, this method can be used when the barrier layer is being applied to an adequately heat-resistant plastic film. According to another method, a saponified polymer is dissolved under heating conditions in a solvent comprising a mixture of water and alcohol, such as methanol or n-propanol, and the resulting solution is coated onto the plastic film by a known technique, such as gravure coating, roller coating, or extrusion coating, and the applied coating is dried to provide the oxygen barrier layer. According to still another method, an oxygen barrier layer is bonded to a separately prepared plastic film using a known adhesive, e.g., an acrylic adhesive. Alternatively, a co-extrusion lamination process may be used to make a composite film of a plastic film such as polyethylene and an oxygen barrier layer according to properly selecting the characteristics of the polymers making up the two components.

According to the invention, the oxygen barrier layer may also be separated from the plastic film by another layer (conventionally referred to as a subbing layer or an anchor coat layer), in order to improve the bond between the plastic film and the barrier layer. Examples of useful subbing layers are those employing polymers containing quaternary salt or carboxyl groups. For example, if a layer containing a copolymer according to the invention or polyvinyl alcohol and a polymer containing a quaternary salt is applied to a gelatin-subbed support in a thickness of from 0.5 to 5μ, a good bond can be obtained by applying an oxygen barrier layer containing a copolymer according to the invention onto the surface of the resulting polymeric subbing layer. Suitable polymers containing a quaternary salt can be selected from various polymers having the following repeating units:

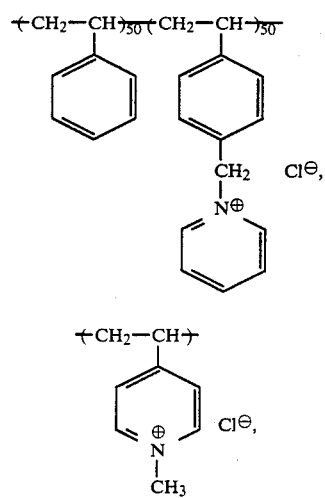

-continued

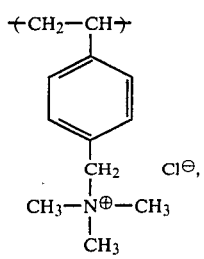

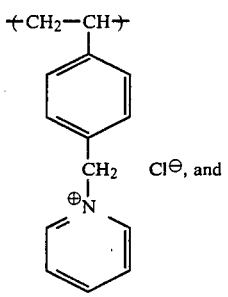

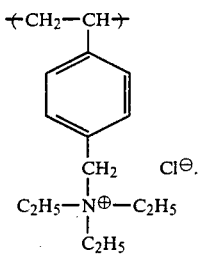

Various photographic layers may be disposed on the photographic support of this invention.

Typical photographic products in which the photographic support of the invention can be usefully employed include color or black-and-white instant photographic products (that is, products providing for image development immediately after exposure) using diffusion transfer processes, photographic products using silver dye bleach processes, color negative products, dye transfer products, and color positive products.

One advantageous application of the photographic support of this invention is to instant photographic products. Instant-photography films are described, for example, in U.S. Pat. Nos. 2,983,605, 3,415,644, 3,415,645, 3,415,646, 3,578,540, 3,573,043, 3,615,421, 3,594,164, 3,594,165, 3,620,724, 3,635,707, and 3,993,486, and in British Pat. Nos. 1,269,805 and 1,330,524.

In the "peel-apart" type instant photographic film wherein a photosensitive sheet is separated from an image-receiving sheet after diffusion transfer processing, the photographic support of this invention can be used as a support for the photosensitive sheet, the image-receiving sheet, or both. When development is performed outside the camera, the supports contain either an opacifying agent, such as carbon black or titanium dioxide, or are provided with an opaque layer containing such opacifying agent.

In the case of a reflective print (that is, wherein the image formed on the image-receiving sheet is viewed under reflected light), the support preferably contains a white pigment, such as titanium dioxide, to provide a white background. Alternatively, a layer containing a white pigment may be disposed between the support and the image-receiving layer.

"Integral" type instant photographic film, wherein the photosensitive sheet need not be separated from the image-receiving sheet after diffusion transfer processing, is also known, and is described in Japanese Patent Publication Nos. 21660/74, 21661/74, Belgian Pat. Nos. 757,959, 757,960, and West German Patent Application (OLS) No. 2,019,430. Such films are also commercially available, such as the SX-70 film (trademark for products of Polaroid Corporation) and PR-10 Film (trademark for products of Eastman Kodak Company). In the case of an "integral" type instant photographic film that comprises a photosensitive sheet and a separate image-receiving sheet, the photographic support of this invention can be used as a support for either one or both of the two sheets. In the case of an "integral" type instant photographic film that comprises a cover sheet and a photosensitive sheet having both an image-receiving layer and a photosensitive layer on the same support, the photographic support of this invention can be used as a support for either one or both of the two sheets.

The photographic support of this invention can be used as a support for the photosensitive sheet or image-receiving sheet of a black-and-white instant film using silver salt diffusion transfer process as described in A. Rott and E. Weyde, *Photographic Silver Halide Diffusion, Processes,* Focal Press, London, 1972.

The photographic support of this invention can also be used as a support for a film using a silver dye bleach process, as described in T. H. James, *The Theory of The Photographic Process,* 4th Ed., 1977, pp. 363–366. When a reflective print is the intended product, either the plastic film, the oxygen barrier layer, or both preferably contain a white pigment such as titanium dioxide.

The photographic support of this invention can also be used as a support for an ordinary color negative or color positive photosensitive material of the type described in T. H. James, supra, pp. 335–362. An antilight piping dye or pigment of the types described hereinabove is preferably incorporated in a small amount in either one or both of the plastic film and oxygen barrier layer when the photographic support of this invention is used as a support for a color negative photosensitive material. Such additives are effective in preventing light transmission through the support.

The photographic support of this invention can in addition be used as a support for the photosensitive sheet or image-receiving sheet for imbibition processes, wherein, as described in T. H. James, supra, p. 327, an imagewise pattern of hardened gelatin is caused to imbibe a dye, which is then transferred to a sheet which preferably contains a dye mordant to thereby form a color image.

The photographic support of this invention can also be used as a support for ink-jet recording in which, as is described in Japanese Patent Application (OPI) No. 89534/74, an image is formed on the support with dots of colored ink that are squirted from a very small nozzle.

For providing photographic layers, a subbing layer can be disposed on the plastic film or the oxygen barrier layer of a photographic support according to the invention. Subbing layers of known composition can be used, depending upon the composition of the photographic layer to be disposed on the subbing layer. The subbing layer is effective in providing a strong bond between the support and the photographic layer. A photographic layer composed of an organic polymer layer containing gelatin can be firmly bonded to the support by means of a subbing layer formed from a gelatin dispersion containing a phenolic derivative, an organic latex containing vinylidene chloride as a copolymerized component, or an SBR (i.e., butadiene styrene rubber) resin latex containing butadiene as a copolymerized component, each of which is dried at a temperature between 100° and 160° C. If a mordanting layer is applied as a photographic layer, the subbing layer may comprise acid-processed gelatin. If an organic polymer layer composed of a cellulose derivative, such as cellulose acetate, cellulose acetate butyrate, etc., or polyacrylate, or a copolymer of acrylic acid and butyl acrylate (preferably in a weight ratio of about 8:2), is applied as a photographic layer, the composition of the subbing layer to be chosen is such that it forms a strong bond with these layers.

After provision of such subbing layers, a variety of photographic layers can be applied. In addition to well known layers such as ordinary silver halide emulsion layers, antihalation layers and backing layers, various layers as described can be applied to photographic layers particularly adapted to instant photography, including mordanted image-receiving layers, alkali neutralizing layers, and backing layers of the types described in U.S. Pat. Nos. 3,958,995, 3,898,088, 3,594,164, 3,594,165, 3,689,262, 3,701,656 and 3,859,096, Japanese Patent Publication Nos. 21660/74 and 16356/71. Other examples of the suitable photographic layers are described in *Research Disclosure*, supra.

One advantage of using a photographic support according to the invention is reduced discoloration, particularly decreased deterioration both by light and during storage of color as well as black-and-white photographic images. With the conventional plastic film supports, it has not been possible to make the plastic film satisfactorily thin, because by so doing the oxygen permeability of the support is increased and the image is more quickly deteriorated. In contrast, the photographic support of this invention prevents deterioration of the image because even a thin plastic film is protected from oxygen permeation by the oxygen barrier layer. The decrease in the thickness of the support that can thus be achieved according to the invention offers a particularly great advantage for a laminated "integral" type instant film having various photographic layers sandwiched between two plastic film supports, because it provides a sheet of photographic film which is very easy to handle during the filing and storage of films.

It has also been found that the use of a photographic support according to the invention has the effect of minimizing changes in photographic sensitivity, density, or gradation that occur while a manufactured film is stored prior to use for taking a picture.

The oxygen barrier layer to be used in this invention thus has the following advantages:
(1) retention of high oxygen barrier properties even in a highly humid environment;
(2) high moisture-proof properties;
(3) a high degree of transparency and absence of color;
(4) high resistance to chemicals; and
(5) good printability (permitting printing operations without any pretreatment in order to make the layer ink-receptive).

The invention is now described in greater detail by reference to the following examples and comparative examples, which are given here for illustrative purposes only and are not intended to limit the scope of the invention.

EXAMPLE 1

An ethylene-vinyl alcohol copolymer (ethylene content: 40 mol%, saponification degree: 98%) was melted at 230° C. and extruded from a die in the form of a thin sheet which was superimposed on a polyester (polyethyleneterephthalate) film (100μ thick), and the laminate was passed through a pair of pressurized chilling rolls to provide a composite film support having a total thickness of 125μ (i.e., oxygen barrier layer of 25μ thick was laminated on the polyester film of 100μ thick).

EXAMPLE 2

The procedure of Example 1 was repeated to make a composite film support except for using a polyester film (100μ thick) which contained 15 wt% titanium dioxide.

EXAMPLE 3

A solution of the composition indicated below was extrusion-coated onto a polyester film (100μ thick) that contained $1.0 \times 10^{-2}$ wt% of titanium dioxide, and was dried to provide a photographic support. The dry thickness of the coating was 15μ.

Coating Solution

Ethylene-vinyl alcohol copolymer (ethylene content: 33 mol%, saponification degree: 99%): 45 g
n-Propyl alcohol: 128 ml
Water: 128 ml

EXAMPLE 4

An oxygen barrier layer coated from a composition identical to that in Example 3 was provided on a polyester film (70μ thick) that contained 100 ppm of a mixture of dyes I, II and III, as shown below, in a weight ratio of 1:2:3. The dry thickness of the coating was 10μ.

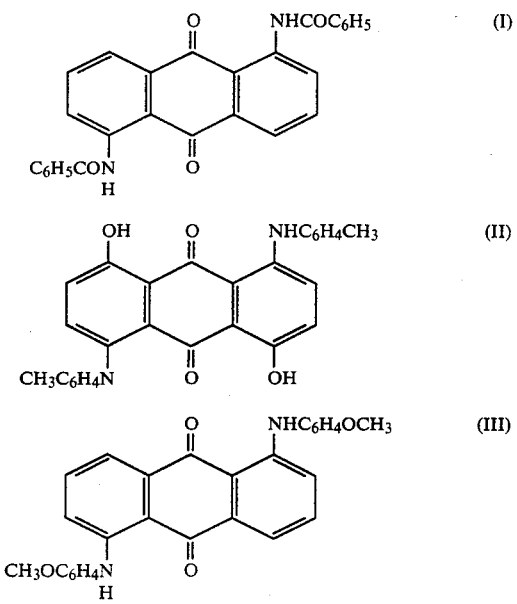

EXAMPLE 5

A polyester film (100μ thick) was coated with a subbing layer comprising a blend of polyvinyl alcohol (2.9 g/m²) and a second polymeric compound (1.4 g/m²) (average M.W.=20,000) of the formula:

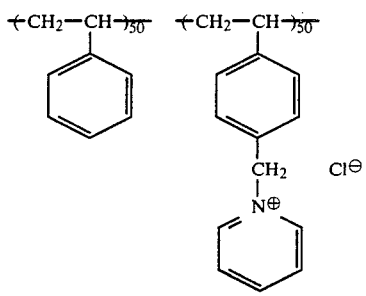

where units are present in 50:50 ratio.

An oxygen barrier layer (dry thickness of 15μ) identical to that prepared in Examples 3 was coated onto the subbing layer. Due to the presence of the subbing lyaer, intimate contact was achieved between the polyester film and the oxygen barrier layer.

EXAMPLE 6

The procedure of Example 3 was repeated to provide a photographic support except that a coating solution of the following composition was used:

Coating Solution

Ethylene-vinyl alcohol copolymer (ethylene content: 33 mol%, saponification degree: 99%): 45 g
2,6-Di-tert-butyl-4-methylphenol: 3 g
n-Propyl alcohol: 128 ml
Water: 128 ml

EXAMPLE 7

The procedure of Example 1 was repeated, except that one of the chilling rolls had a pattern providing a silky surface in the area that contacted a melted polymer extruded from a die. The result was a support having a silky surface on an oxygen barrier layer.

EXAMPLE 8

A coating solution of the same composition as used in Example 3 was applied to a cellulose triacetate film (100μ thick) and dried. The dry thickness of the coated layer was 15μ.

COMPARATIVE EXAMPLE 1

A coating of polyvinyl alcohol (saponification degree: 98%) was applied to a polyester film (100μ thick), and dried to a thickness of 15μ.

COMPARATIVE EXAMPLE 2

A coating of polyvinylidene chloride (Saran Resin F-316, a product of Asahi-Dow Ltd.) was applied to a polyester film (100μ thick), and dried to a thickness of 15μ.

EXAMPLE 9

(1) Preparation of Photosensitive Sheet

The following layers were sequentially coated on the side of the support of Example 1 opposite to the oxygen barrier layer in the order indicated. The resulting sheet was identified as Sample 1. The figures in parentheses indicate the coating weight of solids in terms of grams per square meter:

1. a subbing layer containing gelatin (0.3);

2.

(1) an image-receiving layer containing poly-N-vinyl-benzyl-N,N,N-trihexylammonium chloride (3.0) and gelatin (3.0);

(2) a white reflective layer containing titanium dioxide (20), gelatin (2.86), 2,2'-butylidene-bis(6-tert-butyl-4-methylphenol) (0.6) and diethyl laurylamide (0.3);

(3) an opaque layer containing carbon black (2.7) and gelatin (2.7);

(4) a layer containing a cyan-dye releasing redox compound (0.50) of the formula

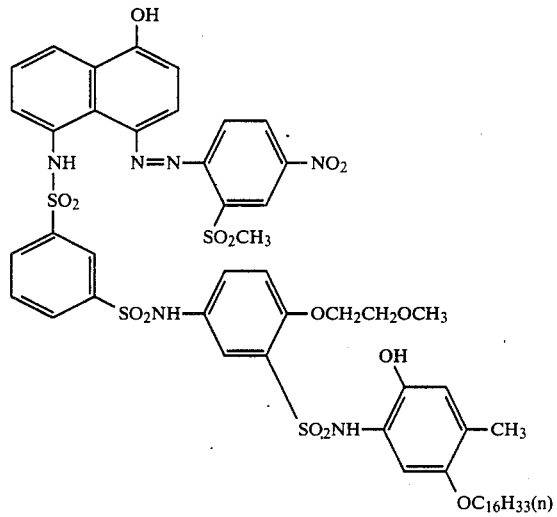

plus N,N-diethyl laurylamide (0.50) and gelatin (1.5);

(5) a layer containing a red-sensitive internal latent imaging emulsion (in gelatin) (1.1), a silver (1.4), 1-acetyl-2-[4-(2,4-di-tert-pentylphenoxyacetamide)phenyl]hydrazine (0.015) and sodium 2-pentadecylhydroquinone-5-sulfonate (0.067);

(6) an interlayer that contains gelatin (1.0), 2,5-di-tert-pentadecylhydroquinone eutectic mixture (1.0) and polyvinyl pyrrolidone-vinyl acetate copolymer (molar ratio of 7:3) (0.25);

(7) a layer containing a magenta-dye releasing redox compound (0.80) of the formula indicated below, N,N-diethyl lauryl amide (0.20) and gelatin (1.2)

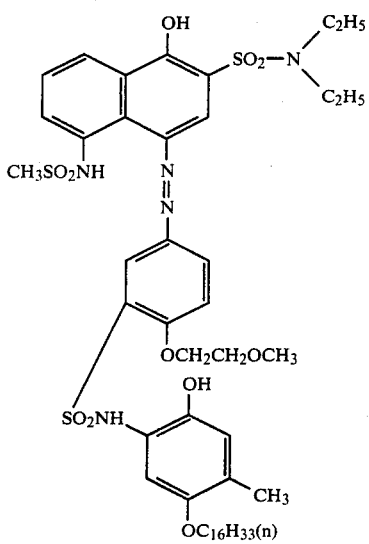

(8) a layer containing a green-sensitive internal latent imaging silver iodobromide emulsion (in gelatin) (1.1), silver (1.4), 1-acetyl-2-[4-(2,4-di-tert-pentyl-phenoxyacetamide)phenyl]hydrazine (0.015) and sodium 2-pentadecylhydroquinone-5-sulfonate (0.067);

(9) an interlayer containing gelatin (1.0), 2,5-di-tert-pentadecylhydroquinone eutectic mixture (1.0) and polyvinyl pyrrolidone-vinyl acetate copolymer (molar ratio of 7:3) (0.25);

(10) a layer containing a yellow-dye releasing redox compound (0.45) of the formula (DRR-1), a yellow-dye releasing redox compound (0.55) of the formula (DRR-2), N,N-diethyllaurylamide (0.25) and gelatin (1.0)

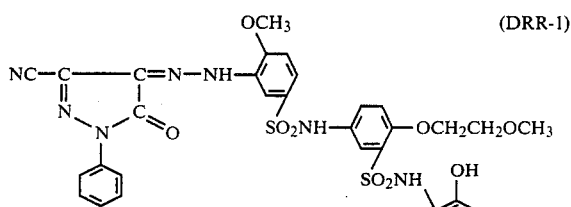
(DRR-1)

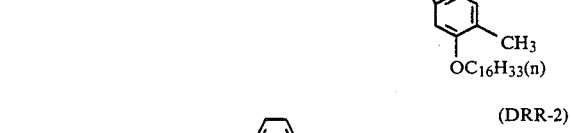
(DRR-2)

(11) a layer containing blue-sensitive internal latent imaging silver iodobromide emulsion (in gelatin) (1.1), silver (1.4), 1-acetyl-2-[4-(2,4-di-tert-pentyl-phenoxyacetamide)phenyl]hydrazine (0.015) and sodium 2-pentadecylhydroquinone-5-sulfonate (0.067); and

(12) a protective layer containing gelatin (1.3), polyethylene acrylic acrylate (0.9), Tinuvin 327 (trademark for product of Ciba-Geigy Co.) (0.5), and hardener trisacryloylperhydrotriazine (0.026).

Further samples were prepared by replacing the support of Example 1 by the supports of Comparative Examples 1 and 2 and a polyester film (100μ thick) which were coated sequentially with the same photographic layers as identified above, thereby providing Comparative Samples 1, 2 and 3.

(2) Composition of Viscous Processing Solution

A processing solution of the following composition was prepared, and was divided into portions each measuring 1.1 cc, which were incorporated in rupturable containers in a nitrogen atmosphere.

$H_2O$: 820 cc
1N $H_2SO_4$: 5 cc
Hydroxyethyl cellulose: 60 g
4-Hydroxymethyl-4-methyl-1-phenyl-3-pyrazolidone: 5 g
5-Methylbenzotriazole: 2 g
tert-Butylhydroquinone: 0.4 g
Sodium sulfite (anhydrous): 2 g
Carbon black: 150 g
Sodium hydroxide: 30 g (3) Cover Sheet A biaxially oriented, transparent polyester film (75μ thick) was sequentially coated with the following layers, and then dried.

(1) 22 g/m² of a 80:20 (weight ratio) copolymer of acrylic acid and butyl acrylate (said copolymer having a viscosity of about 4,000 cp in 25 wt% of water-acetone solution) and 0.44 g/m² of 1,4-bis(2,3'-epoxy-propoxy)butane;

(2) 3.8 g/m² of acetyl cellulose (100 g of acetyl cellulose hydrolyzed to form 39.4 g of acetyl group), 0.2 g/m² of poly(styrene-co-maleic anhydride) (styrene:maleic anhydride at 60:40 wt. ratio, average M.W. about 50,000) and 0.115 g/m² of 5-(β-cyanoethylthio)-1-phenyltetrazole;

(3) 2.5 g/m² of 85:12:3 (wt. ratio) copolymer latex of vinylidene chloride, methyl acrylate and acrylic acid and 0.05 g/m² of polymethyl methacrylate latex (particle size: 1 to 3μ).

(4) Evaluation of Light-Fastness of Color Image

Photosensitive Sample 1, Comparative Samples 1, 2 and 3 were sensitometrically exposed through a continuously graded wedge, each overlaid with a cover sheet identified above, and each treated with a viscous processing solution as identified above, which was spread in a thickness of 80μ. The thus treated samples were dried by letting them stand at 35° C. and 10% RH for two weeks. They were then exposed to a fluorescent lamp at 3,000 lux for 14 days at the relative humidities indicated in Table 1 below. The light fastness of each sample was determined in terms of the residual percentage of the density in an area that had an initial reflection of 1.0.

TABLE 1

| Photo-sensitive Sheet | Percent Residual Dye (30% RH) | | | Percent Residual Dye (90% RH) | | |
|---|---|---|---|---|---|---|
| | Yellow | Magenta | Cyan | Yellow | Magenta | Cyan |
| Sample 1 | 100 | 97 | 87 | 95 | 89 | 83 |
| Comparative | | | | | | |
| Sample 1 | 97 | 96 | 88 | 92 | 67 | 63 |
| Sample 2 | 99 | 94 | 85 | 95 | 83 | 80 |

TABLE 1-continued

| Photo-sensitive Sheet | Percent Residual Dye (30% RH) | | | Percent Residual Dye (90% RH) | | |
|---|---|---|---|---|---|---|
| | Yellow | Magenta | Cyan | Yellow | Magenta | Cyan |
| Sample 3 | 93 | 57 | 55 | 89 | 55 | 50 |

As is seen from the table, Sample 1 using the support of this invention retained a high degree of light fastness whether it was held at 30% RH or 90% RH. On the other hand, Comparative Samples 1 and 2 had a high degree of light fastness under low humidity but their light fast property decreased appreciably under high humidity. Also, the oxygen barrier layer of Comparative Sample 2 exhibited a tendency to turn brown, and stain the image.

EXAMPLE 10

The procedure of Example 9 was repeated except that the support of Example 1 was replaced by that of Example 3 and the polyester film (75μ thick) used as a support for the cover sheet was replaced by the support of Example 4. The resulting photosensitive sheet did not fog even when it was processed outside the camera, exhibiting even more light fastness than did Sample 1 prepared in Example 9.

EXAMPLE 11

The procedure of Example 9 was repeated except that the support of Example 1 was replaced by those of Examples 5, 6 and 7. There was intimate contact between the oxygen barrier layer and the plastic film support of Example 5, and no separation of the oxygen barrier layer occurred during handling of the photographic print. The photographic support of Example 6 was more light fast than that of Example 9. The surface of the photographic support of Example 7 on which the resulting print was to be observed was free from glare due to reflected light, and provided aesthetic appeal.

EXAMPLE 12

A subbing layer of gelatin was applied to the surface of the support of Example 2 on the side opposite to the oxygen barrier layer. The layers indicated in Table 2 below were sequentially applied on the subbing layer to provide a color photosensitive material, which is referred to as Sample 2.

The coating solution for the layer identified as the first layer in Table 2 was prepared in the following manner: 100 g of a yellow coupler (see *6, Table 2) was dissolved in 100 ml of dibutyl phthalate and 200 ml of ethyl acetate. The resulting solution was dispersed in 800 g of 10% aqueous gelatin solution containing 80 ml of 1% aqueous sodium dodecylbenzenesulfonate, and the resulting emulsion was mixed with 1,450 g (70 g of Ag) of a blue-sensitive silver chlorobromide emulsion (Br 80 mol%) to provide a coating solution. The coating solutions for the other layers were prepared in the same manner as for the first layer for producing a color photosensitive material.

TABLE 2

| Sixth Layer | Gelatin (coating weight: 1,000 mg/m²) - |
|---|---|

TABLE 2-continued

| | Protective layer |
|---|---|
| Fifth Layer (red-sensitive layer) | Silver chlorobromide emulsion (Br 50 mol %, coating weight: silver 300 mg/m²), Gelatin (coating weight: 1,000 mg/m²), Cyan coupler (*1) (coating weight: 400 mg/m²), Coupler solvent (*2) (coating weight: 200 mg/m²) |
| Fourth Layer (interlayer) | Gelatin (coating weight: 1,200 mg/m²), UV absorber (*3) (coating weight: 1,000 mg/m²), UV absorber solvent (*2) (coating weight: 250 mg/m²) |
| Third Layer (green-sensitive layer) | Silver chlorobromide emulsion (Br 50 mol %, coating weight: silver 290 mg/m²), Gelatin (coating weight: 1,000 mg/m²), Magenta coupler (*4) (coating weight: 200 mg/m²), Coupler solvent (*5) (coating weight: 200 mg/m²) |
| Second Layer | Gelatin (coating weight: 1,000 mg/m²) - Interlayer |
| First Layer (blue-sensitive layer) | Silver chlorobromide emulsion (Br 80 mol %, coating weight: silver 400 mg/m²), Gelatin (coating weight: 1,200 mg/m²), Yellow coupler (*6) (coating weight: 300 mg/m²), Coupler solvent (*7) (coating weight: 150 mg/m²) |
| Subbing Layer | Gelatin |
| Support | Same as prepared in Example 2. |

(*1) Coupler: 2-[α-(2,4-di-tert-pentlyphenoxy)-butaneamido-4,6-dichloro-5-methylphenol
(*2) Solvent: Dibutyl phthalate
(*3) UV absorber: 2-(2-hydroxy-3-sec-butyl-5-tert-butyl-phenyl)benzotriazole
(*4) Coupler: 1-(2,4,6-trichlorophenyl)-3-(2-chloro-5-tetradecaneamido)anilino-2-pyrazolin-5-one
(*5) Solvent: Tricresyl phosphate
(*6) Coupler: α-Pivaloyl-α-(2,4-dioxo-5,5'-dimethyloxyazolidin-3-yl)-2-chloro-5-[α-(2,4-di-tert-pentylphenoxy)butaneamido]acetanilide
(*7) Solvent: Dioctylbutyl phosphate The respective emulsions were sensitized by the following compounds.

Blue-sensitive emulsion:
sodium salt of 3,3'-di(γ-sulfopropyl)selenacyanine ($2 \times 10^{-4}$ mol per mol of silver halide)

Green-sensitive emulsion:
sodium salt of 3,3'-di(γ-sulfopropyl)-5,5'-diphenyl-9-ethyloxacarbocyanine ($2.5 \times 10^{-4}$ mol per mol of silver halide)

Red-sensitive emulsion:
sodium salt of 3,3'-di(γ-sulfopropyl)-10-methyl-thiadicarbocyanine ($2.5 \times 10^{-4}$ per mol of silver halide)

To prevent irradiation in the emulsion layers, the following dyes were used:

Green-sensitive emulsion layer:

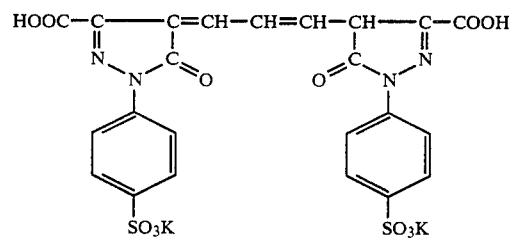

Red-sensitive emulsion layer:

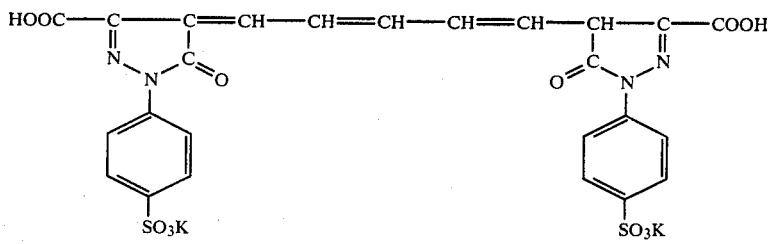

For the green-sensitive emulsion layer, the anti-discoloration agents identified below were added to a magenta-coupler dispersing oil in an amount of 40 mol%, based on the mols of coupler:

Anti-discoloration agent (A)

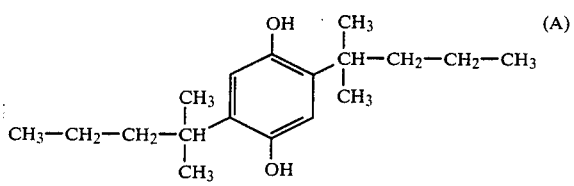

Anti-discoloration agent (B)

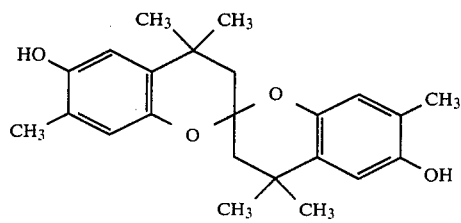

Comparative Sample 4 was prepared, which was identical with Sample 2 except that the support of Example 2 was replaced by a polyester film (100μ thick) containing 15 wt% of titanium dioxide and on which no oxygen barrier layer was coated.

Sample 2 and Comparative Sample 4 were partially exposed to blue light, green light and red light (to provide a color density of 1.0 after development). In contrast, other portions of Sample 2 and Comparative Sample 4 were developed by the same steps without exposure. The development processing was conducted as follows:

| Processing Steps | Temperature | Time |
| --- | --- | --- |
| Development | 33° C. | 3 min 30 sec |
| Bleach-Fix | 33° C. | 1 min 30 sec |
| Washing | 28–35° C. | 3 min |

The formulations of the processing solutions were as follows:

Developing Solution

Benzyl alcohol: 15 ml
Diethylene glycol: 8 ml
Ethylenediaminetetraacetic acid: 5 g
Sodium sulfite: 2 g
Anhydrous potassium carbonate: 30 g
Hydroxylamine sulfate salt: 3 g
Potassium bromide: 0.6 g
4-Amino-N-ethyl-N-(β-methanesulfonamidoethyl)-m-toluidine.$\frac{3}{2}$ sulfate monohydrate salt: 5 g
pH adjusted to 10.20 and water added to make: 1 l Bleach-Fix Solution Ethylenediaminetetraacetic acid: 2 g
Ferric salt of ethylenediaminetetraacetic acid: 40 g
Sodium sulfite: 5 g
Ammonium thiosulfate: 70 g
Water to make: 1 l Each of the samples thus obtained was dried, and the topmost photographic layer was laminated to FUJI Laminate Film (product of Fuji Photo Film Co., Ltd.) under heating.

The samples were then subjected to a discoloration test wherein they were exposed to light for 15 days in a Xenontest (trademark) apparatus (illuminance: 200,000 lux). Density measurement was made with a Macbeth (trademark) densitometer Type RD-514 under blue light, green light and red light. The percent residue of the initial density (1.0) and the increase in the blue color density in the white background were determined. The results are indicated in Table 3 below.

TABLE 3

| Sample No. | Percent Residual Dye | | | Change in Color Density in the White Background ($\Delta^D$B) |
| --- | --- | --- | --- | --- |
| | Yellow | Magenta | Cyan | |
| Sample 2 | 80 | 75 | 73 | +0.05 |
| Comparative Sample 4 | 65 | 40 | 70 | +0.15 |

As is clear from Table 3, the support according to this invention provided a magenta-colored image which was very high in light fastness and the formation of stain was suppressed appreciably.

EXAMPLE 13

A subbing layer of gelatin was applied to the support of Example 1. On the subbing layer, a coating of silver bromide emulsion which contained a cyan dye of the formula shown below, and which was red-sensitized, was applied to obtain a layer having a dry thickness of about 3.5μ:

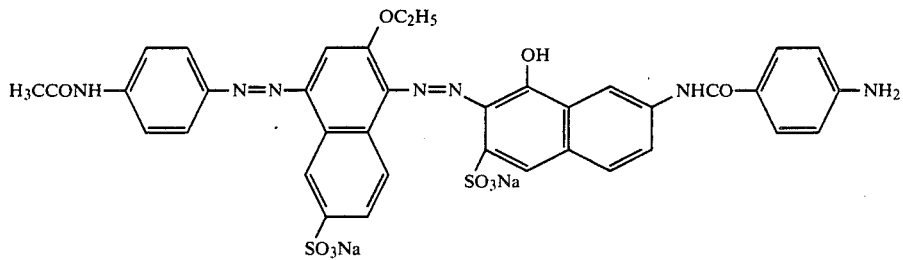

On the red-sensitive emulsion coating, an intermediate layer of gelatin was applied in a dry thickness of about 1.5μ. On the intermediate layer, a coating of silver bromide which contained a magenta dye of the formula shown below, and which was green-sensitized, was applied to form a layer having a dry thickness of about 3μ:

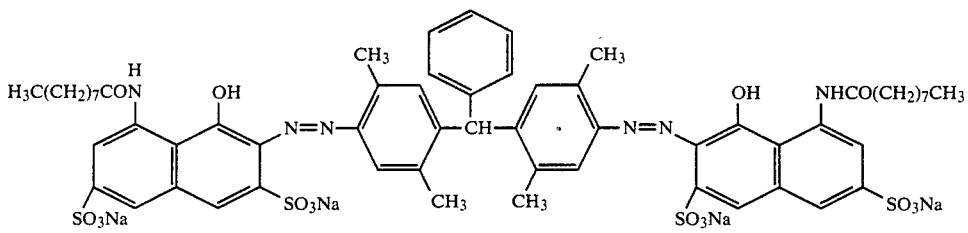

On the green-sensitive emulsion coating, an intermediate layer of gelatin having dispersed therein yellow fine particles of metallic silver was applied in a dry thickness of about 3μ. On the intermediate layer, a coating of silver chlorobromide (silver bromide content: 75 mol%) which contained a yellow dye of the formula shown below, and which was blue-sensitized, was applied to form a layer having a dry thickness of about 2.5μ:

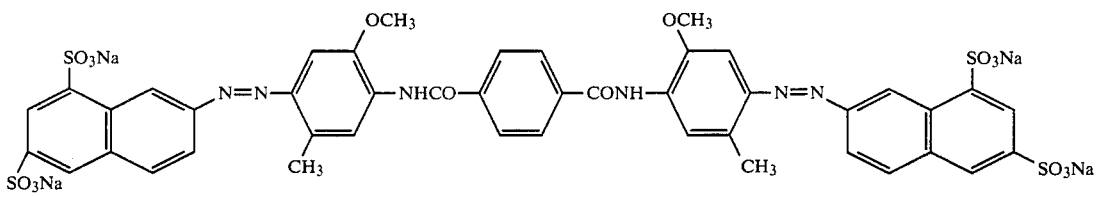

On the blue-sensitive emulsion coating, a protective layer of gelatin was applied in a dry thickness of about 1μ to provide a photosensitive material for silver dye bleach process. The thus prepared photosensitive material had a coating of silver in an amount of 0.8 g/m² in terms of silver nitrate. Using an enlarger (×5) wherein a positive transparency Fuji-Chrome Professional 120 (daylight type) was positioned, the photosensitive material was exposed for 10 seconds to a 2,854° K. tungsten lamp. The exposed material was then processed by the following procedure:

(1) Black-and-white development

The exposed material was developed in a black-and-white developer of the following formulation at 24° C. for 2 minutes, and washed for 2 minutes.

Formulation of monochrome developer

EDTA-2Na: 1 g
Sodium sulfite: 60 g
Hydroquinone: 10 g
Potassium hydroxide (as 48% aq. soln.): 5 cc
Diethylene glycol: 2.0 cc
Dimedone: 0.7 g
Sodium carbonate: 20 g
Potassium bromide: 9 g
Thiadiazole: 0.05 g
Water added to make (EDTA=ethylenediaminetetraacetic acid): 1 l (2) Dye bleaching The photosensitive material was processed with a dye bleaching solution of the following formulation at 24° C. for 4 minutes, and it was washed for 1 minute.

Formulation of dye bleaching solution

Dihydroxyacetone dimer: 4 g
Sulfamic acid: 100 g
Potassium iodide: 40 g
Benzyl alcohol: 10 ml
Acetic acid (50%): 10 ml
Lumichrome: 13 mg
Phenazine: 3 mg
Water added to make: 1 l (3) Desilvering The photosensitive material was processed with a blix solution of the following formulation at 24° C. for 2.5 minutes, and washed for 3 minutes.

Formulation of blix solution

Ammonia water (28%): 3 cc
EDTA.Fe.NH₄: 150 g

EDTA.2NH₄: 20 g
Potassium iodide: 300 g
Water added to make: 1 l

The transparency obtained was dried, and the topmost photographic layer was laminated with Fuji Laminate Film (product of Fuji Photo Film Co., Ltd.) to produce Sample 3. Comparative Sample 5 was prepared which was identical to Sample 3 except that the support of Example 1 was replaced by a transparent polyester film (100μ thick).

Sample 3 and Comparative Sample 5 were exposed to light for 30 days in a Xenontest apparatus (illuminance: 200,000 lux), and the percent residue of the initial density (1.0) was measured. With Comparative Sample 5, the values obtained were 90%, 80% and 90% for yellow, magenta and cyan densities, respectively, whereas with Sample 3, the value was more than 95% in each case, indicating the high light fastness resulting by using a photographic support according to the invention.

While the invention has been described in detail and with reference to specific embodiments thereof, it will be apparent to one skilled in the art that various changes and modifications can be made therein without departing from the spirit and scope thereof.

What is claimed is:

1. A photographic element comprising a photosensitive sheet comprising a support having provided thereon a photosensitive layer and a cover sheet, wherein said support consists essentially of a polyester film having on the surface opposite to the photosensitive layer, an oxygen barrier layer or on both sides of said polyester film, an oxygen barrier layer, wherein said oxygen barrier layer has a thickness of about 0.5μ or more and comprises a copolymer including ethylene units of the formula

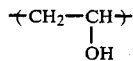

with an ethylene content of about 10 to 90 mol% and a vinyl alcohol content of about 90 to 10 mol%, wherein said element is a laminated integral type instant film in which the photographic layer is sandwiched between the support and a polyester film support.

2. A photographic element according to claim 1, wherein at least one of the polyester film and the oxygen barrier layer contains a dye or a pigment.

3. A photographic element according to claim 1, wherein an oxygen barrier layer is disposed on one surface of the polyester film.

4. A photographic element according to claim 1, wherein the oxygen barrier layer is disposed on both surfaces of the polyester film.

5. A photographic element according to claim 1, wherein the polyester film is polyethyleneterephthalate.

6. A photographic element according to claim 1, wherein at least one of the polyester film and the oxygen barrier layer contains an ultraviolet absorber.

7. A photographic element according to claim 1, wherein the ethylene content of the polymer is from 26 to 45 mol%.

8. A photographic element according to claim 1, wherein the barrier layer comprises a copolymer having a degree of saponification of at least 96%.

9. A photographic element according to claim 1, wherein a subbing layer is disposed between the polyester film and the oxygen barrier layer to provide strong bond between them.

10. A photographic element according to claim 1, wherein the oxygen barrier layer has a thickness of from 0.5 to 100μ.

11. A photographic element according to claim 1, wherein the oxygen barrier layer has a thickness of from 1 to 50μ.

12. A photographic element according to claim 1 including a subbing layer between the polyester film and the barrier layer.

13. A photographic element according to claim 12, wherein the subbing layer comprises a polymer containing quaternary salt or carboxyl groups.

* * * * *